US012025752B2

(12) United States Patent
Gupta et al.

(10) Patent No.: US 12,025,752 B2
(45) Date of Patent: Jul. 2, 2024

(54) SYSTEMS AND METHODS FOR DETECTING ERRONEOUS LIDAR DATA

(71) Applicant: Toyota Motor Engineering & Manufacturing North America, Inc., Plano, TX (US)

(72) Inventors: Rohit Gupta, Santa Clara, CA (US); Roger D. Melen, Los Altos Hills, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 194 days.

(21) Appl. No.: 17/849,034

(22) Filed: Jun. 24, 2022

(65) Prior Publication Data

US 2023/0417885 A1 Dec. 28, 2023

(51) Int. Cl.
*G01S 7/497* (2006.01)
*G01S 17/89* (2020.01)
*G01S 17/931* (2020.01)

(52) U.S. Cl.
CPC .............. *G01S 7/497* (2013.01); *G01S 17/89* (2013.01); *G01S 17/931* (2020.01)

(58) Field of Classification Search
CPC ........... G01S 7/497; G01S 17/93; G01S 17/89
See application file for complete search history.

(56) References Cited

U.S. PATENT DOCUMENTS 9,904,859 B2 2/2018 Grauer
2020/0101890 A1 4/2020 Solar et al.

FOREIGN PATENT DOCUMENTS

KR 101050731 B1 7/2011
KR 20200100103 A 8/2020

OTHER PUBLICATIONS

Gyo Ho Lee, "Ambient Environment Recognition Algorithm Fusing Vision and LiDAR Sensors for Robust Multi-channel V2X System", 2019 (Year: 2019).*

(Continued)

*Primary Examiner* — Maurice C Smith
(74) *Attorney, Agent, or Firm* — Christopher G. Darrow; Darrow Mustafa PC

(57) ABSTRACT

Techniques for detecting erroneous LIDAR data are disclosed herein. One embodiment receives LIDAR point-cloud data pertaining to a robot's environment; receives image data and generates segmented optical-flow data therefrom; fuses, in a 2D grid, a plurality of objects including LIDAR points and optical-flow pixels; executes a hash function that generates, for the plurality of objects, a 1D hash table and an associated index; performs one or more queries using the 1D hash table and the associated index to measure the extent of spatial correspondence between the LIDAR points and the optical-flow pixels; identifies the LIDAR point-cloud data as erroneous, when the extent of spatial correspondence fails to satisfy one or more predetermined criteria; and identifies the LIDAR point-cloud data as valid and controls operation of the robot based, at least in part, on the LIDAR point-cloud data, when the extent of spatial correspondence satisfies the one or more predetermined criteria.

20 Claims, 5 Drawing Sheets

(56) References Cited

OTHER PUBLICATIONS

Bo Wang, "Real-Time 3D Object Detection From Point Cloud Through Foreground Segmentation", 2021 (Year: 2021).*
Shuai Wang, FlowDriveNet: An End-to-End Network for Learning Driving Policies from Image Optical Flow and LiDAR Point Flow, 2021 (Year: 2021).*
Yang, C. et al., "Self-Supervised Video Object Segmentation by Motion Grouping", Proceedings of the IEEE/CVF International Conference on Computer Vision (ICCV), 2021, pp. 7177-7188, available at https://charigyang.github.io/motiongroup/resources/motiongroup.pdf.
Rivera, S. et al., "Auto-Encoding Robot State against Sensor Spoofing Attacks," 2019 IEEE International Symposium on Software Reliability Engineering Workshops (ISSREW), found at https://orbilu.uni.lu/bitstream/10993/41349/1/RIVERA_ISDA2019.pdf.
Liu, L. "Vehicle Localization Based on Scene Perception," Doctoral Dissertation, France, found at https://www.theses.fr/2021UBFCA008.pdf.
Sünderhauf, N. et al., "On the Performance of ConvNet Features for Place Recognition," Proceedings of IEEE International Conference on Intelligent Robots and Systems (IROS), 2015, found at https://arxiv.org/pdf/1501.04158.pdf.
Mao, Z. et al., "Autonomous vehicles can be fooled to 'see' nonexistent obstacles", Government Computer News (GCN) Retrieved from https://gcn.com/emerging-tech/2020/03/autonomous-vehicles-can-be-fooled-to-see-nonexistent-obstacles/303365/. pp. 1-5.
"Optical Flow", Advances in Computers, Retrieved from https://www.sciencedirect.com/topics/engineering/optical-flow (2010) pp. 1-10.
Goodfellow, I. et al., "Attacking machine learning with adversarial examples." OpenAI Blog 24 (2017). Retrieved from https://openai.com/blog/adversarial-example-research/. pp. 1-8.

* cited by examiner

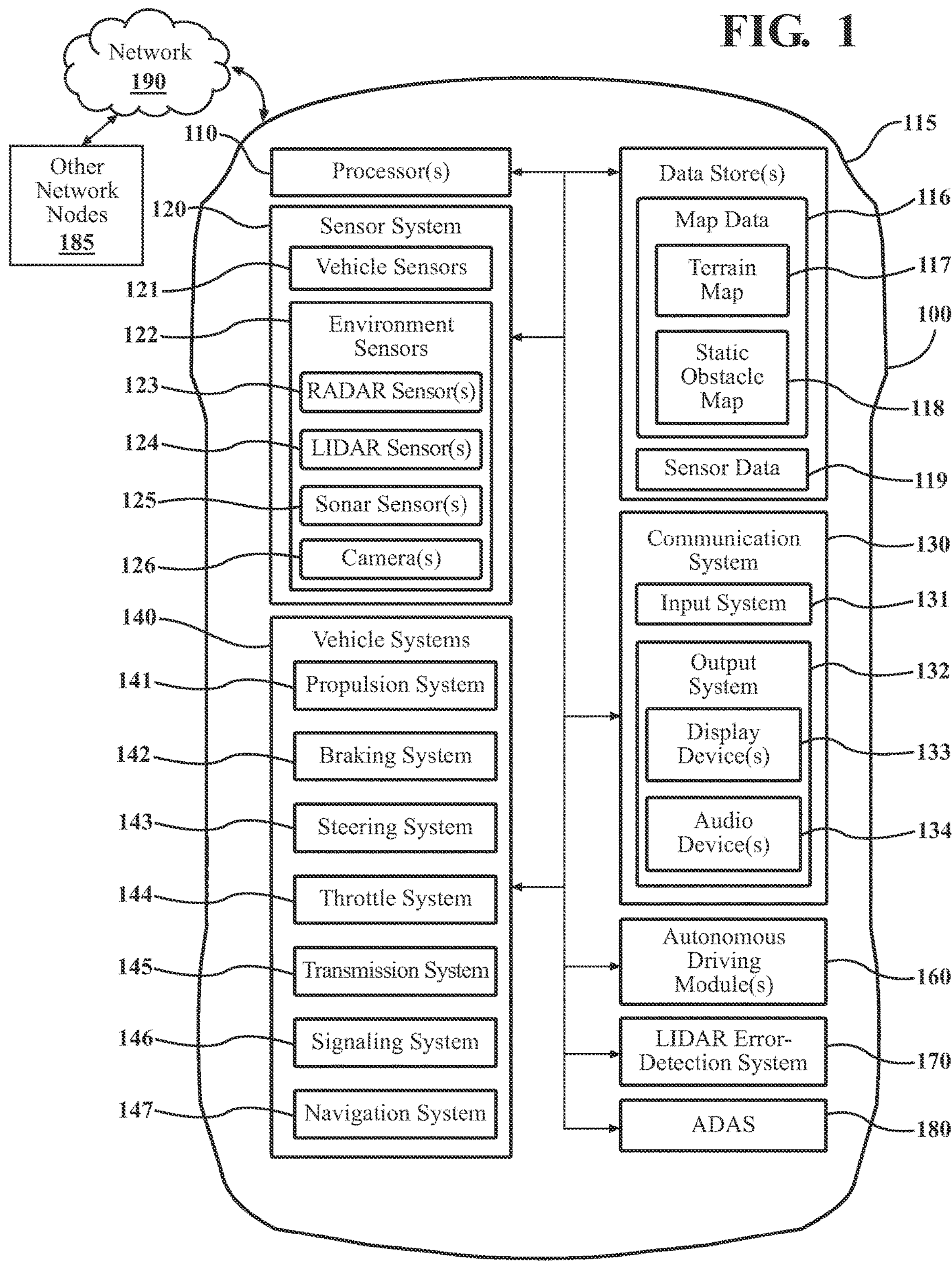
FIG. 1
Network
190
Other Network Nodes
185
110
Processor(s)
120
Sensor System
121
Vehicle Sensors
122
Environment Sensors
123
RADAR Sensor(s)
124
LIDAR Sensor(s)
125
Sonar Sensor(s)
126
Camera(s)
140
Vehicle Systems
141
Propulsion System
142
Braking System
143
Steering System
144
Throttle System
145
Transmission System
146
Signaling System
147
Navigation System
115
Data Store(s)
116
Map Data
117
Terrain Map
100
Static Obstacle Map
118
Sensor Data
119
Communication System
130
Input System
131
Output System
132
Display Device(s)
133
Audio Device(s)
134
Autonomous Driving Module(s)
160
LIDAR Error-Detection System
170
ADAS
180

MAX = 100,100

310

315

320

| 12 | 13 | 14 | 15 |
|---|---|---|---|
| 8 | 9 | 10 | 11 |
| 4 | 5 | 6 | 7 |
| 0 | 1 | 2 | 3 |

MIN = 0,0 x y

| | |
|---|---|
| A | 1 |
| B | 1 |
| C | 1 |
| D | 1 |
| E | 6 |
| F | 9 |
| G | 9 |
| H | 12 |
| I | 14 |
| J | 14 |

FIG. 3C

SYSTEMS AND METHODS FOR DETECTING ERRONEOUS LIDAR DATA

TECHNICAL FIELD

The subject matter described herein generally relates to robots and, more particularly, to systems and methods for detecting erroneous Light Detection and Ranging (LIDAR) data in connection with controlling a robot.

BACKGROUND

A variety of different kinds of robots, including autonomous and semi-autonomous vehicles, can use Light Detection and Ranging (LIDAR) sensors to perceive and analyze the environment surrounding the robot. In some cases, however, LIDAR point-cloud data can be in error. For example, a LIDAR sensor might be damaged or malfunction in a manner that produces erroneous point-cloud data. In other situations, a hacker or other malicious actor can spoof LIDAR signals, causing a robot to detect an obstacle that is either not present or is in a different position/location. Such a misperception can cause serious problems. For example, in the case of an autonomous vehicle, falsely detecting an obstacle could result in a crash because the victim autonomous vehicle might swerve, block traffic, or brake abruptly.

SUMMARY

An example of a system for detecting erroneous Light Detection and Ranging (LIDAR) data is presented herein. The system comprises a processor and a memory storing machine-readable instructions that, when executed by the processor, cause the processor to receive, from a LIDAR sensor, LIDAR point-cloud data corresponding to a scene in an environment of a robot. The memory also stores machine-readable instructions that, when executed by the processor, cause the processor to receive, from a camera, image data corresponding to the scene and generate segmented optical-flow data from the image data. The memory also stores machine-readable instructions that, when executed by the processor, cause the processor to fuse, in a two-dimensional (2D) grid, a plurality of objects that include LIDAR points from the LIDAR point-cloud data and optical-flow pixels from the segmented optical-flow data. The memory also stores machine-readable instructions that, when executed by the processor, cause the processor to execute a hash function that generates, for the plurality of objects in the 2D grid, a one-dimensional (1D) hash table and an associated index. The memory also stores machine-readable instructions that, when executed by the processor, cause the processor to perform one or more queries using the 1D hash table and the associated index to measure an extent of spatial correspondence between the LIDAR points in the 2D grid and the optical-flow pixels in the 2D grid. The memory also stores machine-readable instructions that, when executed by the processor, cause the processor to identify the LIDAR point-cloud data as erroneous, when the extent of spatial correspondence fails to satisfy one or more predetermined criteria. The memory also stores machine-readable instructions that, when executed by the processor, cause the processor to identify the LIDAR point-cloud data as valid and control operation of the robot based, at least in part, on the LIDAR point-cloud data, when the extent of spatial correspondence satisfies the one or more predetermined criteria.

Another embodiment is a non-transitory computer-readable medium for detecting erroneous Light Detection and Ranging (LIDAR) data and storing instructions that when executed by a processor cause the processor to receive, from a Light Detection and Ranging (LIDAR) sensor, LIDAR point-cloud data corresponding to a scene in an environment of a robot. The instructions also cause the processor to receive, from a camera, image data corresponding to the scene and generate segmented optical-flow data from the image data. The instructions also cause the processor to fuse, in a two-dimensional (2D) grid, a plurality of objects that include LIDAR points from the LIDAR point-cloud data and optical-flow pixels from the segmented optical-flow data. The instructions also cause the processor to execute a hash function that generates, for the plurality of objects in the 2D grid, a one-dimensional (1D) hash table and an associated index. The instructions also cause the processor to perform one or more queries using the 1D hash table and the associated index to measure an extent of spatial correspondence between the LIDAR points in the 2D grid and the optical-flow pixels in the 2D grid. The instructions also cause the processor to identify the LIDAR point-cloud data as erroneous, when the extent of spatial correspondence fails to satisfy one or more predetermined criteria. The instructions also cause the processor to identify the LIDAR point-cloud data as valid and control operation of the robot based, at least in part, on the LIDAR point-cloud data, when the extent of spatial correspondence satisfies the one or more predetermined criteria.

In another embodiment, a method of detecting erroneous Light Detection and Ranging (LIDAR) data is disclosed. The method comprises receiving, from a Light Detection and Ranging (LIDAR) sensor, LIDAR point-cloud data corresponding to a scene in an environment of a robot. The method also includes receiving, from a camera, image data corresponding to the scene and generating segmented optical-flow data from the image data. The method also includes fusing, in a two-dimensional (2D) grid, a plurality of objects that include LIDAR points from the LIDAR point-cloud data and optical-flow pixels from the segmented optical-flow data. The method also includes executing a hash function that generates, for the plurality of objects in the 2D grid, a one-dimensional (1D) hash table and an associated index. The method also includes performing one or more queries using the 1D hash table and the associated index to measure an extent of spatial correspondence between the LIDAR points in the 2D grid and the optical-flow pixels in the 2D grid. The method also includes identifying the LIDAR point-cloud data as erroneous, when the extent of spatial correspondence fails to satisfy one or more predetermined criteria. The method also includes identifying the LIDAR point-cloud data as valid and controlling operation of the robot based, at least in part, on the LIDAR point-cloud data, when the extent of spatial correspondence satisfies the one or more predetermined criteria.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

FIG. 1 illustrates one embodiment of a vehicle within which systems and methods disclosed herein may be implemented.

FIG. 3A illustrates a two-dimensional (2D) grid containing a plurality of objects, in accordance with an illustrative embodiment of the invention.

FIG. 3B illustrates a one-dimensional (1D) hash table, in accordance with an illustrative embodiment of the invention.

FIG. 3C illustrates an object index associated with the 1D hash table shown in FIG. 3B, in accordance with an illustrative embodiment of the invention.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 2:
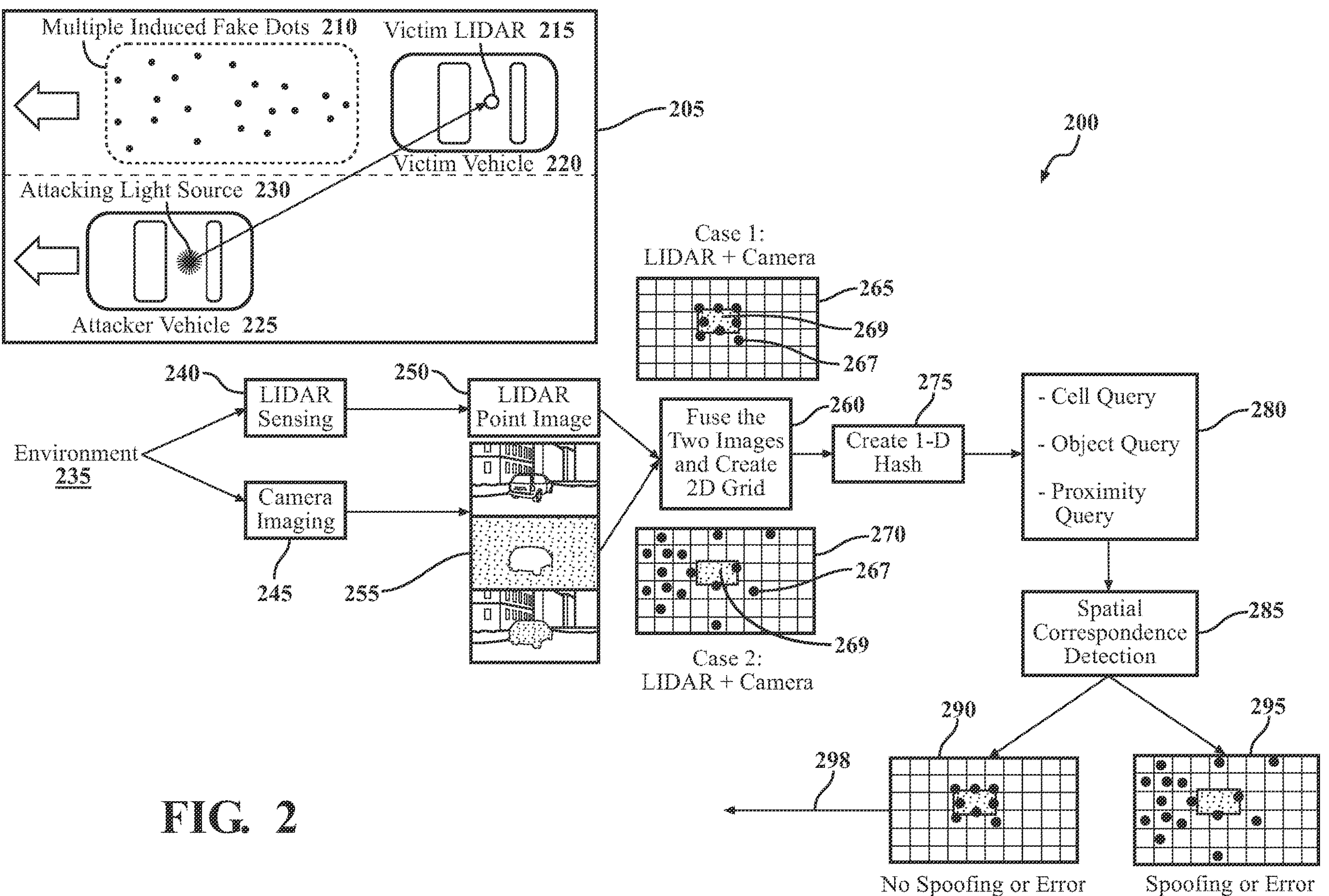
FIG. 2 illustrates the processing flow of a Light Detection and Ranging (LIDAR) error-detection system, in accordance with an illustrative embodiment of the invention.

Various embodiments disclosed herein detect erroneous Light Detection and Ranging (LIDAR) data that, if it were not detected, could potentially be processed by the perception and decision-making subsystems of a robot, possibly with disastrous results. In some embodiments, the erroneous LIDAR data has been spoofed (falsified) by a hacker or other malicious actor to make it appear, to the victim LIDAR sensor, that an object or obstacle is present at a particular location when, in reality, there is no object or obstacle at that location. For example, the object or obstacle in question might be at a different location in the environment of the robot than that indicated by the LIDAR point-cloud data, or the object or obstacle might not be present in the environment of the robot at all. In other embodiments, the LIDAR data erroneously indicates the presence of an object or obstacle at a particular location for a different reason (e.g., sensor miscalibration or malfunction).

In various embodiments of a LIDAR error-detection system disclosed herein, LIDAR point-cloud data can be identified as valid or erroneous using optical-flow data derived from image data. More specifically, a robot receives, from a LIDAR sensor, LIDAR point-cloud data corresponding to a scene in the environment of the robot. The robot also receives from a camera, image data corresponding to the same scene and generates segmented optical-flow data (e.g., a segmented optical-flow image) from the image data. As those skilled in the art are aware, "optical flow" refers to the apparent motion of individual pixels in an image plane over a sequence of image frames (e.g., video frames).

In various embodiments, a robot's LIDAR error-detection system fuses, in a two-dimensional (2D) grid, a plurality of objects that include LIDAR points from the LIDAR point-cloud data and optical-flow pixels from the segmented optical-flow data. The system then executes a hash function that generates, for the plurality of objects in the 2D grid, a one-dimensional (1D) hash table and an associated object index (hereinafter sometimes referred to as simply an "index" or "associated index"). The system can then perform one or more queries using the 1D hash table and the associated index to measure the extent of spatial correspondence between the LIDAR points in the 2D grid and the optical-flow pixels in the 2D grid. The system identifies the LIDAR point-cloud data as erroneous, if the extent of spatial correspondence fails to satisfy one or more predetermined criteria (e.g., a spatial-correlation threshold). In some embodiments, the erroneous LIDAR point-cloud data is intentionally withheld from downstream subsystems and processes in the robot (e.g., an ADAS or autonomous-driving subsystem, in a vehicular embodiment). The system identifies the LIDAR point-cloud data as valid (free of spoofing or other error) and controls operation of the robot based, at least in part, on the LIDAR point-cloud data, if the extent of spatial correspondence satisfies the one or more predetermined criteria just mentioned.

The techniques for detecting erroneous LIDAR data disclosed herein can be applied to a wide variety of autonomous and semi-autonomous outdoor and indoor robots. For example, in some embodiments, the robot is, without limitation, an autonomous aerial drone, an autonomous watercraft (e.g., a boat or submarine), a delivery robot, a medical robot, a military robot (e.g., a battlefield robot or a bomb-defusing robot), a service robot, or a companionship robot.

In other embodiments, the robot is a land vehicle (e.g., an automobile). For example, in one embodiment, the robot is a vehicle equipped with an Advanced Driver-Assistance System (ADAS). When the LIDAR error-detection system determines that LIDAR point-cloud data is valid, the system can provide the LIDAR point-cloud data to the ADAS so that the operation of the vehicle can be controlled based, at least in part, on the LIDAR point-cloud data. As mentioned above, if the system determines that the LIDAR point-cloud data is erroneous (e.g., spoofed), the system, in some embodiments, does not forward the LIDAR point-cloud data to the ADAS. That is, the system withholds the LIDAR point-cloud data from further usage by the robot. In other embodiments, the erroneous LIDAR point-cloud data can be forwarded to a downstream subsystem such as an ADAS, but the LIDAR error-detection system flags or annotates the LIDAR point-cloud data as untrustworthy so any downstream algorithms can take that into account (e.g., by ignoring the LIDAR point-cloud data or assigning it a low weight in an analysis of the scene).

In another embodiment, the robot is an autonomous vehicle (e.g., one capable of operating at what the automotive industry refers to as autonomy Levels 3-5). When the LIDAR error-detection system determines that LIDAR point-cloud data is valid, the system can provide the LIDAR point-cloud data to an autonomous-driving subsystem of the autonomous vehicle so that the autonomous vehicle's operation is controlled based, at least in part, on the LIDAR point-cloud data. As with other embodiments discussed herein, if the LIDAR error-detection system determines that the LIDAR point-cloud data is erroneous (e.g., spoofed), the system can either withhold the LIDAR point-cloud data from further use by the robot, or the LIDAR point-cloud data can be provided to downstream subsystems or processes with an accompanying flag or annotation indicating that the LIDAR point-cloud data is not trustworthy and should be handled accordingly. Various embodiments of a LIDAR error-detection system are discussed in greater detail below.

Referring to FIG. 1, an example of a vehicle 100, in which systems and methods disclosed herein can be implemented, is illustrated. As used herein, a "vehicle" is any form of motorized land transport. One example of a "vehicle," without limitation, is an automobile. In some embodiments, vehicle 100 can operate, at least some of the time, in a mode that approaches or achieves fully autonomy (e.g., autonomy Levels 3-5). In other embodiments, vehicle 100 can operate in a semi-autonomous mode (e.g., via an adaptive cruise-control system, an automatic lane-change assistance system, or an automatic parking system). In still other embodiments, vehicle 100 includes an intelligent driving assistance system such as an Advanced Driver-Assistance System (ADAS) 180 to assist a human driver while vehicle 100 is operating in a manual driving mode. As shown in FIG. 1, a vehicle 100 can include a LIDAR error-detection system 170 to benefit from the functionality discussed herein. Instances of vehicle 100, as used herein, are equally applicable to any device capable of incorporating the systems or methods described herein. As discussed above, a vehicle 100 is only one example of a robot in which a LIDAR error-detection system, as described herein, can be embodied. For purposes of illustration only, vehicle-based embodiments of a LIDAR error-detection system are emphasized throughout the remainder of this Detailed Description.

The vehicle 100 includes various elements, as shown in FIG. 1. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including LIDAR error-detection system 170. While the various elements are shown as being located within the vehicle 100 in FIG. 1, it will be understood that one or more of these elements can be located external to the vehicle 100. Further, the elements shown may be physically separated by large distances. As shown in FIG. 1, in some embodiments, vehicle 100 can communicate with other network nodes 185 (e.g., other connected vehicles, cloud servers, edge servers, roadside units, infrastructure) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, LIDAR sensor(s) 124, sonar sensor(s) 125, and camera(s) 126. Of particular interest in the context of various embodiments of a LIDAR error-detection system 170 described herein are LIDAR sensor(s) 124 and camera(s) 126, as explained further below.

One or more of these various types of environment sensors 122 can be used to detect objects (e.g., external road agents such as other vehicles, bicyclists, motorcyclists, pedestrians, and animals) and, in other respects, understand the environment surrounding vehicle 100 and its associated traffic situations and conditions. This process is sometimes referred to as "traffic-situation understanding" or "scene understanding." In some embodiments, this analysis of the external environment and traffic situations can be carried out entirely or in part by ADAS 180. In embodiments in which vehicle 100 is capable of semi-autonomous or fully autonomous operation, vehicle 100 includes autonomous driving module(s) 160 to control autonomous or semi-autonomous operation. The autonomous driving module(s) 160 may be part of an autonomous-driving subsystem of vehicle 100 that controls various vehicle systems 140.

FIG. 2 illustrates the processing flow 200 of a LIDAR error-detection system 170 in a vehicle 100, in accordance with an illustrative embodiment of the invention. Though FIG. 2 illustrates a processing flow 200 in the context of a vehicle 100, an analogous processing flow can be designed and implemented for a variety of other kinds of outdoor and indoor robots.

Inset 205 in FIG. 2 illustrates one way in which a hacker or other malicious actor can spoof LIDAR signals in a vehicular context. In inset 205, a victim vehicle 220 and an attacker vehicle 225 are both traveling on a roadway in the direction indicated by the arrows (to the left in FIG. 2). As indicated in FIG. 2, the victim vehicle 220 is equipped with victim LIDAR 215, and the attacker vehicle 225 is equipped with an attacking light source 230. As those skilled in the art are aware, LIDAR detection is based on the measured delay between emitted light and received reflected light. In the example of inset 205, the attacker vehicle 225 can receive the LIDAR pulse from the victim LIDAR 215, wait for a specified period, then transmit the delayed signal back to the victim LIDAR 215. This process can be used to create a spurious obstacle (e.g., an apparent vehicle or other object) that is not actually present at the apparent location/position by causing the victim LIDAR 215 to detect multiple induced fake dots 210. In the discussion of processing flow 200 that follows, two different cases will be considered, one in which the LIDAR point-cloud data is valid (no spoofing or error) and one in which the LIDAR point-cloud data has been spoofed, as in inset 205, or is otherwise in error.

As shown in FIG. 2, processing flow 200 pertains to an environment 235 of a robot, in this embodiment a vehicle 100, as discussed above. Herein, the "environment" of a robot means a region surrounding the robot. Such an environment may be relatively small (e.g., extending only a few inches from the robot), or it may be relatively large (e.g., extending tens of meters or even farther from the robot), depending on the embodiment. Processing flow 200 begins with LIDAR sensing 240 (see LIDAR sensor(s) 124 in FIG. 1) and camera imaging 245 (see camera(s) 126 in FIG. 1). LIDAR sensing 240 produces three-dimensional (3D) LIDAR point-cloud data (not shown in FIG. 2), from which a 2D "slice" at a selected range, a LIDAR point image 250, can be derived. Camera imaging 245 produces a sequence of 2D images (e.g., Red-Green-Blue or "RGB" images). Processing the sequence of images produces an optical-flow image 255 indicating how image pixels move from frame to frame in the sequence of images. In some embodiments, the optical-flow image 255 is segmented using a technique such as semantic segmentation to, for example, classify pixels as belonging to the background or to the "blob" of pixels associated with a moving object in the scene (e.g., a vehicle).

Techniques for estimating optical flow and performing image segmentation are known to those skilled in the art. In some embodiments, machine-learning-based techniques (e.g., one or more trained neural networks) are employed to estimate optical flow from the image-sequence data (camera imaging 245) and/or to segment the resulting optical-flow image 255.

As shown in FIG. 2, fusion operation 260 fuses (composites, overlays, superimposes) the two images—the LIDAR point image 250 and the optical-flow image 255—in a 2D grid. In Case 1 (265), there is no spoofing or other error involved in the LIDAR point-cloud data. In Case 2 (270), there is spoofing or other error present in the LIDAR point-cloud data. Notice that, in Case 1, the LIDAR points 267 and the optical-flow pixels 269 of the "blob" mentioned above in the 2D grid largely coincide spatially. In contrast, in Case 2, the LIDAR points 267 and the optical-flow pixels 269, for the most part, do not coincide with one another spatially. This difference in the extent of spatial correspondence between the LIDAR points 267 in the 2D grid and the optical-flow pixels 269 in the 2D grid is how LIDAR error-detection system 170 can detect erroneous (e.g., spoofed) LIDAR point-cloud data, as in Case 2 (270), or valid LIDAR point-cloud data, as in Case 1 (265). Measuring the extent of spatial correspondence is discussed in greater detail below in connection with FIGS. 3A, 3B, and 3C. A brief overview is provided in the discussion of the remainder of FIG. 2 that follows.

As shown in FIG. 2, a hash function 275 generates a 1D hash table and an associated index of the objects in the 2D grid. As explained above, "objects," in the context of the 2D grid, refers to LIDAR points 267 from the LIDAR point image 250 and optical-flow pixels 269 from the segmented optical-flow image 255. Once the 1D hash table and associated index have been created, one or more queries 280 can be performed using the 1D hash table and associated index to measure the extent of spatial correspondence between the LIDAR points 267 and the optical-flow pixels 269 (spatial correspondence detection 285, in FIG. 2). In FIG. 2, the two possible outcomes corresponding to Case 1 (265) and Case 2 (270), respectively, are the result for Case 1 (290) (no spoofing or other error) and the result for Case 2 (295) (spoofing or other error). As shown in FIG. 2, if the LIDAR point-cloud data is valid (Case 1), processing flow 200 can include transmission (298) of the LIDAR point-cloud data and/or information derived therefrom to a downstream process (e.g., an ADAS, autonomous-driving subsystem, etc.). In a situation like Case 2 (spoofing or other error present), the LIDAR point-cloud data can either be withheld from further use by the vehicle 100 (or other robot), or the LIDAR point-cloud data can be forwarded (298) to a downstream process with a flag or annotation that the LIDAR point-cloud data is not trustworthy, depending on the embodiment.

FIG. 3A illustrates 2D grid 310 containing a plurality of objects, in accordance with an illustrative embodiment of the invention. In the example of FIG. 3A, 2D grid 310 is a 4×4 arrangement of spatial cells 315. Thus, 2D grid 310 includes a total of 16 cells 315 numbered, in this example, from 0 to 15. As discussed above in connection with FIG. 2, the objects 320 in 2D grid 310 include LIDAR points 267 and optical-flow pixels 269 that have been fused in the 2D grid 310. In the example of FIG. 3A, there are 10 such objects 320 identified with the letters "A" through "J." As shown in FIG. 3A, objects A-D are in Cell 1, E is in Cell 6, F and G are in Cell 9, H is in Cell 12, and I and J are in Cell 14.

FIG. 3B illustrates a 1D hash table 325, in accordance with an illustrative embodiment of the invention. By executing a hash function on the 2D grid 310 containing the plurality of objects 320, a 1D hash table 325 can be generated. The 1D hash table 325 is a relatively simple data structure in which each "bucket" (numbered "0" through "15") of the hash table indicates which objects 320, if any, are located in the corresponding cell 315 of the 2D grid 310. Thus, through a simple lookup of a given bucket, it is possible to determine which objects 320, if any, are found in the corresponding cell 315 of the 2D grid 310.

FIG. 3C illustrates an object index 330 associated with the 1D hash table 325 shown in FIG. 3B, in accordance with an illustrative embodiment of the invention. In addition to generating 1D hash table 325, the hash function can also generate an associated index 330 of the objects in the 2D grid 310. As shown in FIG. 3C, index 330 includes an entry for each of the 10 objects (A-J) in the 2D grid 310. Each object entry is mapped to the cell 315 in which that particular object is found in 2D grid 310.

The 1D hash table 325 and associated index 330 discussed above in connection with FIGS. 3B and 3C, respectively, can be used to perform one or more of several different kinds of queries to measure the extent of spatial correspondence between the LIDAR points 267 and the optical-flow pixels 269 that have been fused in the 2D grid 310. The queries 280 can include one or more of the following: (1) a cell query that identifies which objects in the plurality of objects 320 are in a particular cell 315 of the 2D grid 310, (2) an object query that identifies a cell 315 of the 2D grid 310 in which a particular object 320 in the plurality of objects is located, and (3) a proximity query that identifies one or more objects 320 in the plurality of objects that are within a predetermined distance of a particular object 320. Regarding the proximity query, this query can answer a question such as, "Which objects are near Object A?" The degree of nearness can be specified, in some embodiments, in terms of the number of cells 315 separating the object of interest (e.g., Object A) from the other objects 320. In a different embodiment, the predetermined distance can also be specified in terms of the (x, y) coordinates of the objects 320 within the 2D grid 310. Regarding the computational burden on LIDAR error-detection system 170, it should be noted that each of the three different types of queries 280 discussed above can be performed as an O(1) operation. This is one advantage of the hash-based implementations described herein.

Figure 4:
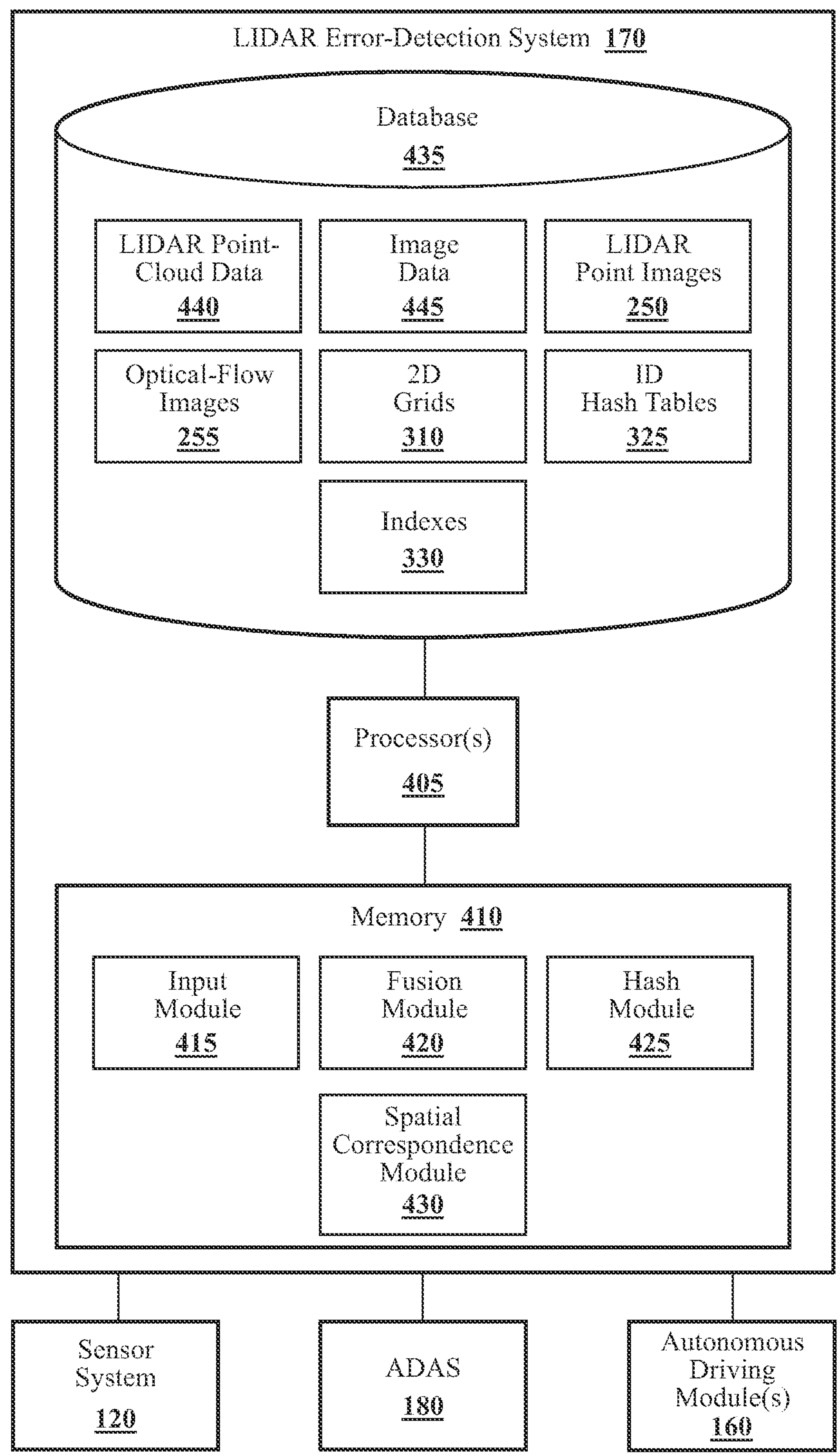
FIG. 4 is a block diagram of one embodiment of a LIDAR error-detection system.

FIG. 4 is a block diagram of a LIDAR error-detection system 170, in accordance with an illustrative embodiment of the invention. As discussed above, LIDAR error-detection system 170, in some embodiments, is installed in a vehicle 100. In other embodiments, a LIDAR error-detection system can be installed in any of a variety of other types of semi-autonomous and autonomous robots. In the embodiment of FIG. 4, LIDAR error-detection system 170 is shown as including one or more processors 405, one or more of which, in some embodiments, could coincide with the one or more processors 110 of the vehicle 100 of FIG. 1. In general, the one or more processors 405 may be exclusively a part of LIDAR error-detection system 170, LIDAR error-detection system 170 may include one or more processors from the one or more processors 110 of the vehicle 100, or LIDAR error-detection system 170 may access the one or more processors 405 through a data bus or another communication path, depending on the embodiment.

In the embodiment of FIG. 4, memory 410 stores an input module 415, a fusion module 420, a hash module 425, and a spatial correspondence module 430. The memory 410 is a random-access memory (RAM), read-only memory (ROM), a hard-disk drive, a flash memory, or other suitable memory for storing the modules 415, 420, 425, and 430. The modules 415, 420, 425, and 430 are, for example, computer-readable instructions that, when executed by the one or more processors 405, cause the one or more processors 405 to perform the various functions disclosed herein.

LIDAR error-detection system 170 can store various kinds of data in a database 435. Examples include LIDAR point-cloud data 440 from sensor system 120 (LIDAR sensor(s) 124), image data 445 from sensor system 120 (camera(s) 126), LIDAR point images 250, optical-flow images 255, 2D grids 310, 1D hash tables 325, and associated indexes 330.

As indicated in FIG. 4, LIDAR error-detection system 170 is in communication with sensor system 120 to receive LIDAR point-cloud data 440 and image data 445. Depending on the particular embodiment, LIDAR error-detection system 170 can also communicate with ADAS 180 and/or autonomous driving module(s) 160.

Input module 415 generally includes instructions that, when executed by the one or more processors 405, cause the one or more processors 405 to receive, from a LIDAR sensor 124, LIDAR point-cloud data 440 corresponding to a scene in the environment 235 of a robot (e.g., a vehicle 100). Input module 415 also includes instructions that, when executed by the one or more processors 405, cause the one or more processors 405 to receive, from a camera 126, image data 445 corresponding to the scene and generate segmented optical-flow data (e.g., a segmented optical-flow image 255) from the image data 445. As discussed above, estimation of the optical-flow data and/or the segmentation of the optical-flow data (e.g., classifying pixels as "background" or as part of a "blob" of pixels associated with a moving object in the scene) can, in some embodiments, be performed using machine-learning-based (e.g., neural-network-based) techniques.

Fusion module 420 generally includes instructions that, when executed by the one or more processors 405, cause the one or more processors 405 to fuse, in a 2D grid 310, a plurality of objects 320 that include LIDAR points 267 from the LIDAR point-cloud data 440 (e.g., from a LIDAR point image 250) and optical-flow pixels 269 from the segmented optical-flow data (e.g., from a segmented optical-flow image 255). In this context, "fusing" means to take a "slice" of the 3D LIDAR point-cloud data at a selected range and to composite or superimpose, in the 2D grid 310, the resulting LIDAR points 267 with the optical-flow pixels 269. In some cases, a LIDAR point 267 might happen to coincide spatially with an optical-flow pixel 269 in the 2D grid 310. That is, they might be on top of each other in the 2D grid 310. As those skilled in the art will recognize, accurate spatial alignment between the LIDAR point image 250 and the optical-flow image 255 for creation of the 2D grid 310 can be achieved through defining a spatial coordinate system and performing viewpoint calibration between the LIDAR sensor(s) 124 and the camera(s) 126 beforehand.

Hash module 425 generally includes instructions that, when executed by the one or more processors 405, cause the one or more processors 405 to execute a hash function 275 that generates, for the plurality of objects 320 in the 2D grid 310, a 1D hash table 325 and an associated index 330 of the objects 320 in the 2D grid 310. The 2D grid 310 containing the objects 320, the 1D hash table 325, and the index 330 are discussed in greater detail above in connection with FIGS. 3A-3C. The 1D hash table 325 and the associated index 330 facilitate object-related, cell-related, and proximity-related queries 280 by spatial correspondence module 430 to measure the extent of spatial correspondence between the LIDAR points 267 in the 2D grid 310 and the optical-flow pixels 269 in the 2D grid 310.

Spatial correspondence module 430 generally includes instructions that, when executed by the one or more processors 405, cause the one or more processors 405 to perform one or more queries 280 using the 1D hash table 325 and the associated index 330 to measure the extent of spatial correspondence between the LIDAR points 267 in the 2D grid 310 and the optical-flow pixels 269 in the 2D grid 310. As discussed above, in some embodiments, the queries 280 include one or more of the following: (1) a cell query that identifies which objects in the plurality of objects 320 are in a particular cell 315 of the 2D grid 310, (2) an object query that identifies a cell 315 of the 2D grid 310 in which a particular object 320 in the plurality of objects is located, and (3) a proximity query that identifies one or more objects 320 in the plurality of objects that are within a predetermined distance of a particular object 320. Regarding the proximity query, as discussed above, this query can answer a question such as, "Which objects are near Object A?" The degree of nearness can be specified, in some embodiments, in terms of the number of cells 315 separating the object of interest (e.g., Object A) from the nearby objects 320. In a different embodiment, the predetermined distance can be specified in terms of the (x, y) coordinates of the objects 320 within the 2D grid 310. As discussed above, regarding the computational burden on LIDAR error-detection system 170, each of the three different types of queries 280 discussed above can be performed as an O(1) operation. This is one of the advantages of the implementation techniques disclosed herein that employ a 1D hash table 325 and an associated index 330.

Spatial correspondence module 430 also includes instructions that, when executed by the one or more processors 405, cause the one or more processors 405 to identify the LIDAR point-cloud data 440 as erroneous, when the extent of spatial correspondence between the LIDAR points 267 in the 2D grid 310 and the optical-flow pixels 269 in the 2D grid 310 fails to satisfy one or more predetermined criteria. Spatial correspondence module 430 also includes instructions that, when executed by the one or more processors 405, cause the one or more processors 405 to identify the LIDAR point-cloud data 440 as valid (free of spoofing or other error) and control operation of the robot (e.g., a vehicle 100) based, at least in part, on the LIDAR point-cloud data 440, when the extent of spatial correspondence between the LIDAR points 267 in the 2D grid 310 and the optical-flow pixels 269 in the 2D grid 310 satisfies the one or more predetermined criteria.

The one or more predetermined criteria can vary, depending on the embodiment. In one embodiment, the one or more predetermined criteria include a correlation threshold (e.g., a threshold expressed in terms of percentage correlation). For example, in one embodiment, if the spatial correlation is greater than 70%, spatial correspondence module 430 determines that the LIDAR point-cloud data 440 is valid (i.e., that it is free of spoofing or other error). In this embodiment, if the correlation is poor (e.g., less than 40%), spatial correspondence module 430 determines that the LIDAR point-cloud data 440 has been hacked (e.g., spoofed) or that the LIDAR point-cloud data 440 is erroneous for some other reason (e.g., a faulty LIDAR sensor 124).

As explained above, what spatial correspondence module 430 does with the LIDAR point-cloud data 440 once it has been identified as valid or erroneous varies, depending on the embodiment. First, consider the case in which spatial correspondence module 430 identifies the LIDAR point-cloud data 440 as being valid (no spoofing or other error). In some embodiments, the robot is a vehicle (e.g., a vehicle 100) equipped with an ADAS 180, and controlling operation of the robot based, at least in part, on the LIDAR point-cloud data 440 includes providing the LIDAR point-cloud data 440 to the ADAS 180. In other embodiments, the robot is an autonomous vehicle, and controlling operation of the robot based, at least in part, on the LIDAR point-cloud data 440 includes providing the LIDAR point-cloud data 440 to an autonomous-driving subsystem (e.g., autonomous driving module(s) 160) of the autonomous vehicle. In both kinds of vehicular embodiments just mentioned, controlling operation of the vehicle 100 based, at least in part, on the LIDAR point-cloud data 440 includes controlling one or more of acceleration, braking, and steering (refer to vehicle systems 140 in FIG. 1). In more general terms, when spatial correspondence module 430 identifies the LIDAR point-cloud data 440 as valid, spatial correspondence module 430 controls the operation of the robot based, at least in part, on the LIDAR point-cloud data 440, and controlling the operation of the robot can, in some embodiments, include providing the LIDAR point-cloud data 440 to a downstream subsystem or process of the robot (e.g., the ADAS 180 or the autonomous driving module(s) 160, in a vehicular embodiment).

Second, consider the case in which spatial correspondence module 430 identifies the LIDAR point-cloud data 440 as being erroneous (e.g., due to hacking/spoofing or some other cause). In some embodiments, spatial correspondence module 430 withholds the LIDAR point-cloud data 440 from further use by the robot. That is, spatial correspondence module 430 does not forward the LIDAR point-cloud data 440 to any of the robot's downstream subsystems or processes (e.g., an ADAS 180 or autonomous driving module(s) 160, in a vehicular embodiment). In other embodiments, spatial correspondence module 430 forwards the erroneous LIDAR point-cloud data 440 to one or more downstream subsystems or processes, but spatial correspondence module 430 flags or otherwise annotates the LIDAR point-cloud data 440 as being erroneous or untrustworthy so that any downstream algorithms receiving the LIDAR point-cloud data 440 will take that into account (e.g., by giving the LIDAR point-cloud data 440 little or no weight in an analysis of the scene).

Figure 5:
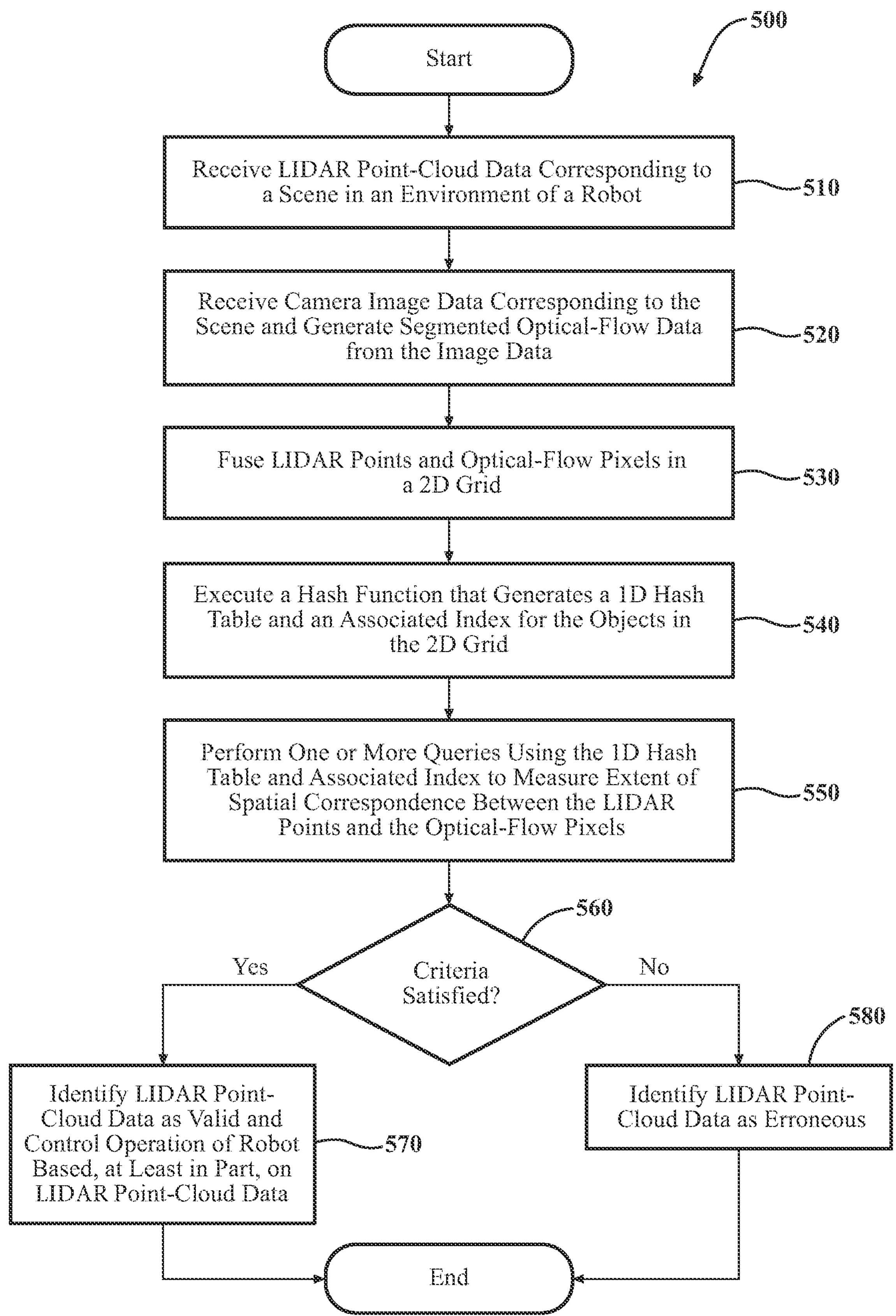
FIG. 5 is a flowchart of a method of detecting erroneous LIDAR data, in accordance with an illustrative embodiment of the invention.

FIG. 5 is a flowchart of a method 500 of detecting erroneous LIDAR data, in accordance with an illustrative embodiment of the invention. Method 500 will be discussed from the perspective of the LIDAR error-detection system 170 in FIG. 4. While method 500 is discussed in combination with LIDAR error-detection system 170, it should be appreciated that method 500 is not limited to being implemented within LIDAR error-detection system 170, but LIDAR error-detection system 170 is instead one example of a system that may implement method 500.

At block 510, input module 415 receives, from a LIDAR sensor 124, LIDAR point-cloud data 440 corresponding to a scene in an environment 235 of a robot.

At block 520, input module 415 receives, from a camera 126, image data 445 corresponding to the same scene and generates segmented optical-flow data (e.g., a segmented optical-flow image 255) from the image data 445. As discussed above, estimation of the optical-flow data and/or the segmentation of the optical-flow data (e.g., classifying pixels as "background" or part of a "blob" of pixels associated with a moving object in the scene) can, in some embodiments, be performed using machine-learning-based (e.g., neural-network-based) techniques.

At block 530, fusion module 420 fuses, in a 2D grid 310, a plurality of objects 320 that include LIDAR points 267 from the LIDAR point-cloud data 440 (e.g., from a LIDAR point image 250) and optical-flow pixels 269 from the segmented optical-flow data (e.g., a segmented optical-flow image 255). As discussed above, in this context, "fusing" means to take a "slice" of the 3D LIDAR point-cloud data 440 at a selected range and to composite or superimpose the resulting LIDAR points 267 with the optical-flow pixels 269 in the 2D grid 310. In some cases, a LIDAR point 267 might happen to coincide spatially with an optical-flow pixel 269 in the 2D grid 310. That is, they might be on top of each other in the 2D grid 310. As also discussed above, accurate spatial alignment between the LIDAR point image 250 and the optical-flow image 255 for creation of the 2D grid 310 can be achieved through defining a spatial coordinate system and performing viewpoint calibration between the LIDAR sensor(s) 124 and the camera(s) 126 beforehand.

At block 540, hash module 425 executes a hash function 275 that generates, for the plurality of objects 320 in the 2D grid 310, a 1D hash table 325 and an associated index 330 of objects 320 in the 2D grid 310. The 2D grid 310 containing the objects 320, the 1D hash table 325, and the index 330 are discussed in greater detail above in connection with FIGS. 3A-3C.

At block 550, spatial correspondence module 430 performs one or more queries 280 using the 1D hash table 325 and the associated index 330 to measure the extent of spatial correspondence between the LIDAR points 267 in the 2D grid 310 and the optical-flow pixels 269 in the 2D grid 310. As discussed above, in some embodiments, the queries 280 include one or more of the following: (1) a cell query that identifies which objects in the plurality of objects 320 are in a particular cell 315 of the 2D grid 310, (2) an object query that identifies a cell 315 of the 2D grid 310 in which a particular object 320 in the plurality of objects is located, and (3) a proximity query that identifies one or more objects 320 in the plurality of objects that are within a predetermined distance of a particular object 320. Regarding the proximity query, as discussed above, this query can answer a question such as, "Which objects are near Object A?" The degree of nearness can be specified, in some embodiments, in terms of the number of cells 315 separating the object of interest (e.g., Object A) from the nearby objects 320. In a different embodiment, the predetermined distance can be specified in terms of the (x, y) coordinates of the objects 320 within the 2D grid 310. As also discussed above, regarding the computational burden on LIDAR error-detection system 170, each of the three different types of queries 280 discussed above can be performed as an O(1) operation, an advantage of the implementation techniques disclosed herein.

At block 560, spatial correspondence module 430 determines whether one or more predetermined criteria concerning the extent of spatial correspondence between the LIDAR points 267 in the 2D grid 310 and the optical-flow pixels 269 in the 2D grid 310 are satisfied. If so, control proceeds to block 570. If not, control proceeds to block 580. As discussed above, the one or more predetermined criteria for the extent of spatial correspondence between the LIDAR points 267 in the 2D grid 310 and the optical-flow pixels 269 in the 2D grid 310 can vary, depending on the embodiment. In one embodiment, the one or more predetermined criteria include a correlation threshold (e.g., a threshold expressed in terms of percentage correlation). For example, in one embodiment, if the spatial correlation is greater than 70%, spatial correspondence module 430 determines that the LIDAR point-cloud data 440 is valid—that it is free of spoofing or other error. In this embodiment, if the correlation is poor (e.g., less than 40%), spatial correspondence module 430 determines that the LIDAR point-cloud data 440 has been hacked (e.g., spoofed) or that the LIDAR point-cloud data 440 is erroneous for some other reason (e.g., a faulty LIDAR sensor 124).

At block 570, spatial correspondence module 430 identifies the LIDAR point-cloud data 440 as being valid (i.e., no spoofing or other detected errors) and controls operation of the robot (e.g., a vehicle 100) based, at least in part, on the LIDAR point-cloud data 440. As discussed above, controlling the operation of the robot can, in some embodiments, include forwarding the LIDAR point-cloud data 440 to one or more of the robot's downstream subsystems or processes (e.g., an ADAS 180 or autonomous driving module(s) 160, in a vehicular embodiment). As also discussed above, in a vehicular embodiment, controlling the operation of the robot can include controlling one or more of acceleration, braking, and steering.

At block 580, spatial correspondence module 430 identifies the LIDAR point-cloud data 440 as erroneous (i.e., that it has been spoofed/hacked or that it is in error for some other reason, such as a faulty LIDAR sensor 124). As discussed above, in some embodiments, spatial correspondence module 430 withholds erroneous LIDAR point-cloud data 440 from further use by the robot. That is, in those embodiments, spatial correspondence module 430 does not forward the LIDAR point-cloud data 440 to any of the robot's downstream subsystems or processes (e.g., an ADAS 180 or autonomous driving module(s) 160, in a vehicular embodiment). In other embodiments, spatial correspondence module 430 forwards the erroneous LIDAR point-cloud data 440 to one or more downstream subsystems or processes, but spatial correspondence module 430 flags or otherwise annotates the LIDAR point-cloud data 440 as being erroneous or untrustworthy so that any downstream algorithms receiving the LIDAR point-cloud data 440 will take that into account (e.g., by giving the LIDAR point-cloud data 440 little or no weight in an analysis of the scene).

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for detecting erroneous Light Detection and Ranging (LIDAR) data, the system comprising:

a processor; and a memory storing machine-readable instructions that, when executed by the processor, cause the processor to:

receive, from a LIDAR sensor, LIDAR point-cloud data corresponding to a scene in an environment of a robot;

receive, from a camera, image data corresponding to the scene and generate segmented optical-flow data from the image data;

fuse, in a two-dimensional (2D) grid, a plurality of objects that include LIDAR points from the LIDAR point-cloud data and optical-flow pixels from the segmented optical-flow data;

execute a hash function that generates, for the plurality of objects in the 2D grid, a one-dimensional (1D) hash table and an associated index;

perform one or more queries using the 1D hash table and the associated index to measure an extent of spatial correspondence between the LIDAR points in the 2D grid and the optical-flow pixels in the 2D grid;

identify the LIDAR point-cloud data as erroneous, when the extent of spatial correspondence fails to satisfy one or more predetermined criteria; and identify the LIDAR point-cloud data as valid and control operation of the robot based, at least in part, on the LIDAR point-cloud data, when the extent of spatial correspondence satisfies the one or more predetermined criteria.

2. The system of claim 1, wherein the one or more queries include at least one of a cell query that identifies which objects in the plurality of objects are in a particular cell of the 2D grid, an object query that identifies a cell of the 2D grid in which a particular object in the plurality of objects is located, and a proximity query that identifies one or more objects in the plurality of objects that are within a predetermined distance of the particular object.

3. The system of claim 1, wherein the robot is one of an autonomous aerial drone, an autonomous watercraft, a delivery robot, a medical robot, a military robot, a service robot, and a companionship robot.

4. The system of claim 1, wherein the robot is a vehicle equipped with an Advanced Driver-Assistance System (ADAS) and the instructions to control operation of the robot based, at least in part, on the LIDAR point-cloud data include instructions that, when executed by the processor, cause the processor to provide the LIDAR point-cloud data to the ADAS.

5. The system of claim 4, wherein the instructions to control operation of the robot based, at least in part, on the LIDAR point-cloud data include instructions that, when executed by the processor, cause the processor to control at least one of acceleration, braking, and steering.

6. The system of claim 1, wherein the robot is an autonomous vehicle and the instructions to control operation of the robot based, at least in part, on the LIDAR point-cloud data include instructions that, when executed by the processor, cause the processor to provide the LIDAR point-cloud data to an autonomous-driving subsystem of the autonomous vehicle.

7. The system of claim 6, wherein the instructions to control operation of the robot based, at least in part, on the LIDAR point-cloud data include instructions that, when executed by the processor, cause the processor to control at least one of acceleration, braking, and steering.

8. The system of claim 1, wherein the instructions include further instructions that, when executed by the processor, cause the processor to withhold the LIDAR point-cloud data from usage by the robot, when the LIDAR point-cloud data has been identified as erroneous.

9. The system of claim 1, wherein the one or more predetermined criteria include a correlation threshold.

10. A non-transitory computer-readable medium for detecting erroneous Light Detection and Ranging (LIDAR) data and storing instructions that, when executed by a processor, cause the processor to:

receive, from a Light Detection and Ranging (LIDAR) sensor, LIDAR point-cloud data corresponding to a scene in an environment of a robot;

receive, from a camera, image data corresponding to the scene and generate segmented optical-flow data from the image data;

fuse, in a two-dimensional (2D) grid, a plurality of objects that include LIDAR points from the LIDAR point-cloud data and optical-flow pixels from the segmented optical-flow data;

execute a hash function that generates, for the plurality of objects in the 2D grid, a one-dimensional (1D) hash table and an associated index;

perform one or more queries using the 1D hash table and the associated index to measure an extent of spatial correspondence between the LIDAR points in the 2D grid and the optical-flow pixels in the 2D grid;

identify the LIDAR point-cloud data as erroneous, when the extent of spatial correspondence fails to satisfy one or more predetermined criteria; and identify the LIDAR point-cloud data as valid and control operation of the robot based, at least in part, on the LIDAR point-cloud data, when the extent of spatial correspondence satisfies the one or more predetermined criteria.

11. The non-transitory computer-readable medium of claim 10, wherein the one or more queries include at least one of a cell query that identifies which objects in the plurality of objects are in a particular cell of the 2D grid, an object query that identifies a cell of the 2D grid in which a particular object in the plurality of objects is located, and a proximity query that identifies one or more objects in the plurality of objects that are within a predetermined distance of the particular object.

12. A method, comprising:

receiving, from a Light Detection and Ranging (LIDAR) sensor, LIDAR point-cloud data corresponding to a scene in an environment of a robot;

receiving, from a camera, image data corresponding to the scene and generating segmented optical-flow data from the image data;

fusing, in a two-dimensional (2D) grid, a plurality of objects that include LIDAR points from the LIDAR point-cloud data and optical-flow pixels from the segmented optical-flow data;

executing a hash function that generates, for the plurality of objects in the 2D grid, a one-dimensional (1D) hash table and an associated index;

performing one or more queries using the 1D hash table and the associated index to measure an extent of spatial correspondence between the LIDAR points in the 2D grid and the optical-flow pixels in the 2D grid;

identifying the LIDAR point-cloud data as erroneous, when the extent of spatial correspondence fails to satisfy one or more predetermined criteria; and identifying the LIDAR point-cloud data as valid and controlling operation of the robot based, at least in part, on the LIDAR point-cloud data, when the extent of spatial correspondence satisfies the one or more predetermined criteria.

13. The method of claim 12, wherein the one or more queries include at least one of a cell query that identifies which objects in the plurality of objects are in a particular cell of the 2D grid, an object query that identifies a cell of the 2D grid in which a particular object in the plurality of objects is located, and a proximity query that identifies one or more objects in the plurality of objects that are within a predetermined distance of the particular object.

14. The method of claim 12, wherein the robot is one of an autonomous aerial drone, an autonomous watercraft, a delivery robot, a medical robot, a military robot, a service robot, and a companionship robot.

15. The method of claim 12, wherein the robot is a vehicle equipped with an Advanced Driver-Assistance System (ADAS) and controlling operation of the robot based, at least in part, on the LIDAR point-cloud data includes providing the LIDAR point-cloud data to the ADAS.

16. The method of claim 15, wherein controlling operation of the robot based, at least in part, on the LIDAR point-cloud data includes controlling at least one of acceleration, braking, and steering.

17. The method of claim 12, wherein the robot is an autonomous vehicle and controlling operation of the robot based, at least in part, on the LIDAR point-cloud data includes providing the LIDAR point-cloud data to an autonomous-driving subsystem of the autonomous vehicle.

18. The method of claim 17, wherein controlling operation of the robot based, at least in part, on the LIDAR point-cloud data includes controlling at least one of acceleration, braking, and steering.

19. The method of claim 12, further comprising withholding the LIDAR point-cloud data from usage by the robot, when the LIDAR point-cloud data has been identified as erroneous.

20. The method of claim 12, wherein the one or more predetermined criteria include a correlation threshold.

* * * * *